May 13, 1924.
L. A. HENRY
EGG TESTER
Filed May 19, 1923
1,493,538
2 Sheets-Sheet 1
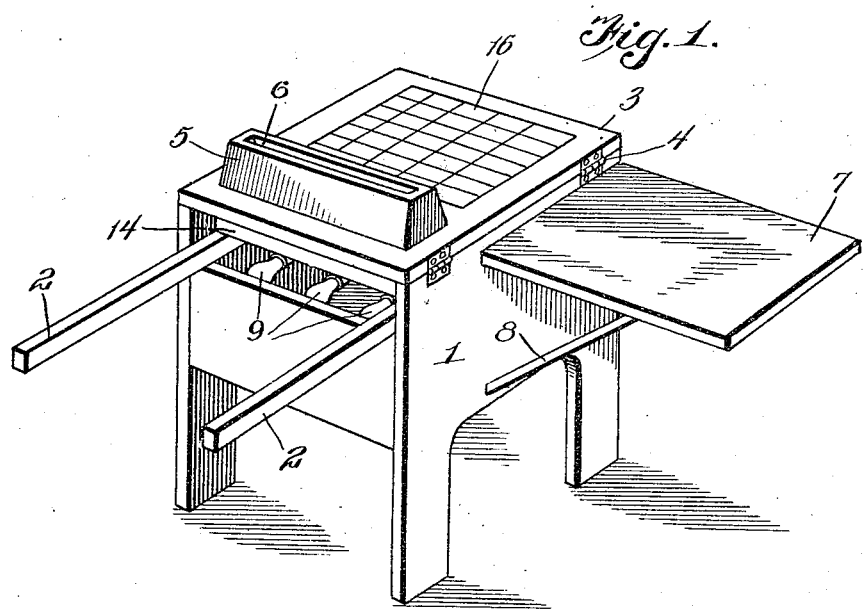
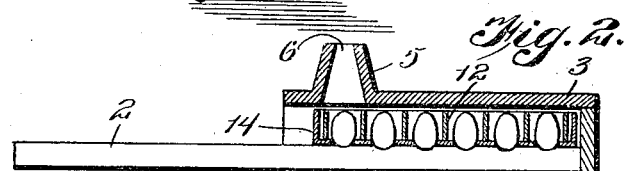
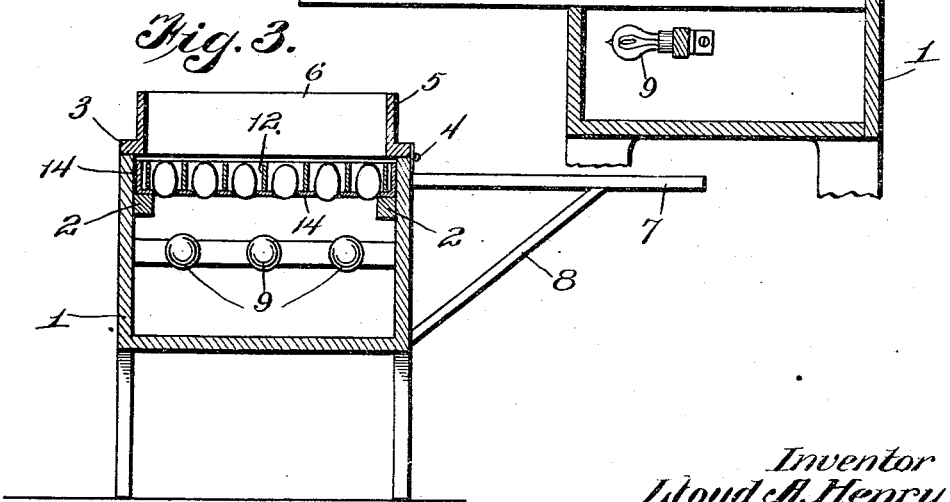
Inventor
Lloyd A. Henry
Atty May 13, 1924.
L. A. HENRY
EGG TESTER
Filed May 19, 1923    2 Sheets-Sheet 2
1,493,538
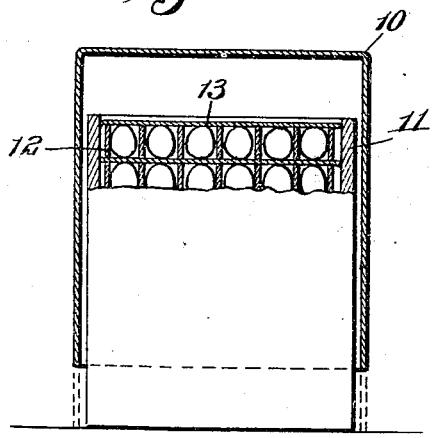
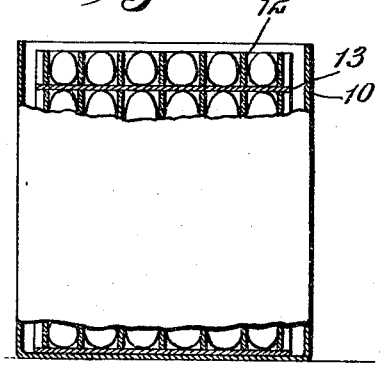
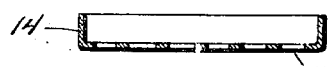
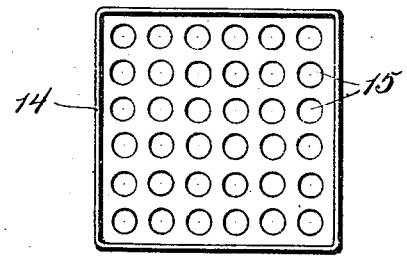
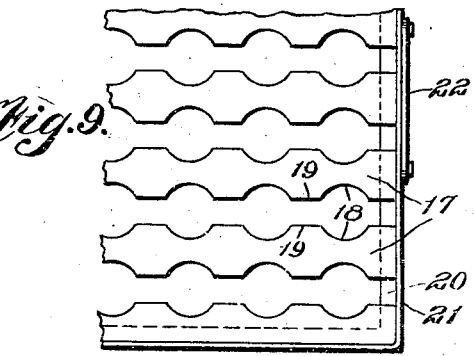
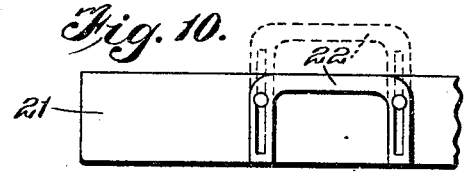
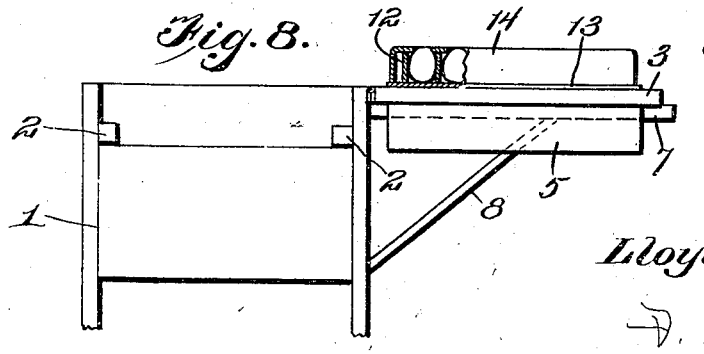
Inventor
Lloyd A. Henry
Atty Patented May 13, 1924.

1,493,538

UNITED STATES PATENT OFFICE.

LLOYD A. HENRY, OF HELENA, MONTANA.

EGG TESTER.

Application filed May 19, 1923. Serial No. 640,266.

*To all whom it may concern:*

Be it known that LLOYD A. HENRY, a citizen of the United States, residing at Helena, in the county of Lewis and Clark and State of Montana, has invented certain new and useful Improvements in Egg Testers, of which the following is a specification.

This invention relates to an egg tester, wherein provision is made for conveniently handling the eggs in bulk and rapidly and conveniently testing the eggs to provide a more effective expeditious and therefore economical manner of securing the result desired.

The invention contemplates a testing apparatus combined with means for conveniently transferring the eggs in bulk from the usual shipping crates, the final transference of the eggs arranging them in a position to be conveniently handled in bulk in the testing apparatus with extreme simplicity and the minimum of time.

The invention is illustrated in the accompanying drawings, in which:

Fig. 1 is a perspective view of the testing apparatus.

Fig. 2 is a vertical longitudinal section of the same, eggs being shown in position therein.

Fig. 3 is a transverse section of the same.

Fig. 4 is a sectional view showing the use of the transferring case in connection with an ordinary egg crate.

Fig. 5 is a similar view showing the transfer of the eggs from the shipping crate to the transferring case.

Figs. 6 and 7 show a transverse section and plan respectively of the egg carrier in which the eggs are finally positioned for use in the testing apparatus.

Fig. 8 is a view in elevation partly in section showing the initial application of the carrier to the testing apparatus.

Fig. 9 is a view of a carrier designed particularly for use in dipping the eggs into a material such as oil to render the shell more transparent.

Fig. 10 is a detail of the same.

Fig. 11 is a broken sectional view showing how the parts of the modified form of carrier are connected.

The improved setting apparatus comprises a box-like structure 1, having the side walls thereof provided with longitudinal guide strips 2 which extend beyond the forward wall of the apparatus to slidably receive and support the egg carrier as will be later described. The testing apparatus includes a top 3 hingedly connected to the walls at 4 and formed with a transversely arranged integral hood portion 5 open at the top at 6 to provide a sight opening. The apparatus includes a shelf 7 having braces 8 extending to the box proper, the shelf being of a length and width to support the cover 3 when the same is in open relation for the application of the egg carrier as will be later described. A source of illumination here indicated as a series of electric lamps 9 are arranged within the box in vertical alignment with the sight opening 6.

As a part of the testing apparatus, I provide a transfer case 10 in the form of a container open at the top, which is adapted to telescope over the usual egg shipping crate 11. The length and breadth of the transfer case is greater than the similar dimensions of the shipping crate so that after the transfer case is arranged over the shipping crate, the latter and the transfer case may be reversed, permitting the eggs to be deposited in the transfer case by the mere removal of the shipping crate. The eggs then are in their usual cell strips 12 with the separating card board sheets 13, and by reason of the greater width and breadth of the transfer case as compared with that of the shipping crate, there is a space entirely around the supported body of eggs so that the user may lift off the upper cell set 12 by raising the underlying supporting sheet 13. A layer of eggs is thus removed from the transferring case and an egg carrier indicated at 14 is inverted over this removed layer of eggs, the latter being still in their cell-like formations and still supported on the usual sheet 13. The egg carrier 14 is a metallic member having side and end walls of appropriate height and formed with openings 15 of a size to permit a portion of the egg to project therethrough without permitting the egg to pass entirely through said opening.

After the egg carrier has been inverted over the layer of eggs described, the top 3 of the testing apparatus is turned back on to the shelf 7, and the layer of eggs within the inverted container placed upon the lower side of the cover, which lower side is now uppermost. The sheet 13 is then withdrawn from beneath the eggs and egg carrier, and the cover is turned back into operative position, the egg carrier being held against the cover during this movement. When the cover 3 is finally in operative position, the egg carrier with the contained eggs is supported upon the guide strips 2.

Obviously now the eggs may be readily inspected by means of the light from the sources 9 shining through the eggs, as each row of eggs is successively brought into line with the sight opening by movement of the egg carrier.

If desired and as preferred, the cover 3 of the apparatus may be provided at 16 with a chart having spaces corresponding to the number and positions of the eggs in the carrier, so that the condition of each egg as it is tested may be noted on the chart for guidance in sorting the eggs.

It may be found desirable under some conditions to subject the eggs to a bath or immersion to render the shells more transparent. For this purpose, the carrier shown in Fig. 6 may be substituted by a carrier indicated in Figs. 9 to 11, wherein a shallow receptacle is provided with division plates 17, with their meeting edges formed at 18 to permit partial projection of the eggs therethrough, and said meeting edges being farther spaced at 19 to provide for the convenient escape of the excess fluid after the eggs are dipped. The strips 17 may be supported on angle plates 20 secured to the walls 21 of the carrier, and said carrier may have handles 22 slidably connected to the walls to permit said handles to be raised for convenience in the dipping operation and to be depressed when the carrier is cooperating with the egg tester.

From the above, it will be apparent that means are provided whereby eggs may be conveniently transferred in layers from the usual shipping crate to the testing apparatus and quickly and rapidly tested in such apparatus, with a constant and steady illuminating means to insure the same testing effect and with means whereby the results of the test may be indicated on chart sheets to assist in rapid sorting of the eggs as may be desired.

Claims:

1. An egg tester including a casing having a hinged cover, said cover being formed with a sight opening, guide strips mounted in the casing below the cover, and an egg carrier adapted to be supplied with eggs and arranged in reverse position on the cover when the latter is open, the closing of the cover transferring the carrier onto the guide strips for movement beneath the sight opening.

2. In an apparatus of the class described, the combination with a source of light, of a table having a hinged cover, ways upon the table and beneath the cover, an oversize case adapted to be sleeved over the usual egg case, whereby the respective walls of the oversize case and the usual egg case are brought into spaced relation with respect to each other sufficiently to admit the hand of the operator between the walls to withdraw a single layer of eggs arranged in rows, a testing container having a perforated bottom and adapted to be telescoped over the layer of eggs and placed upon said ways, whereby each row of eggs is movable, one row at a time into alignment with the sight aperture, and a source of light.

In testimony whereof I affix my signature.

LLOYD A. HENRY.